United States Patent
Startz

(10) Patent No.: US 7,489,860 B2
(45) Date of Patent: Feb. 10, 2009

(54) DEVICE FOR HEATING A LIQUID WITH STEAM

(75) Inventor: Armin Startz, Weidenstetten (DE)

(73) Assignee: WMF Wuerttembergische Metallwarenfabrik AG, Geislingen (DE)

( * ) Notice: Subject to any disclaimer, the term of this patent is extended or adjusted under 35 U.S.C. 154(b) by 229 days.

(21) Appl. No.: 11/643,326

(22) Filed: Dec. 20, 2006

(65) Prior Publication Data

US 2007/0196081 A1 Aug. 23, 2007

(30) Foreign Application Priority Data

Dec. 22, 2005 (EP) .................................. 05028246

(51) Int. Cl.
F24C 1/14 (2006.01)
B67D 5/62 (2006.01)

(52) U.S. Cl. .................... 392/478; 222/146.4; 99/279

(58) Field of Classification Search ................ 392/478; 222/146.4
See application file for complete search history.

(56) References Cited

U.S. PATENT DOCUMENTS

| | | | | |
|---|---|---|---|---|
| 1,261,986 | A * | 4/1918 | White | 222/129.1 |
| 2,653,733 | A * | 9/1953 | Rudd et al. | 222/129.4 |
| 4,358,029 | A * | 11/1982 | Yomoda | 222/133 |
| 5,272,960 | A * | 12/1993 | Kinna | 99/280 |
| 5,395,569 | A * | 3/1995 | Badertscher et al. | 261/62 |
| 6,082,713 | A * | 7/2000 | King | 261/79.2 |
| 6,713,110 | B2 * | 3/2004 | Imboden et al. | 426/511 |
| 6,805,041 | B2 * | 10/2004 | Colston et al. | 99/295 |
| 6,997,103 | B2 * | 2/2006 | Shaw et al. | 99/295 |
| 7,021,206 | B2 * | 4/2006 | Eckenhausen et al. | 99/452 |
| 7,226,631 | B2 * | 6/2007 | Thakur et al. | 426/477 |
| 7,252,034 | B1 * | 8/2007 | Eckenhausen et al. | 99/293 |
| 7,347,345 | B2 * | 3/2008 | Guerrero et al. | 222/148 |
| 2002/0129712 | A1 * | 9/2002 | Westbrook et al. | 99/279 |
| 2003/0089244 | A1 * | 5/2003 | Imboden et al. | 99/453 |
| 2004/0025701 | A1 * | 2/2004 | Colston et al. | 99/279 |
| 2005/0269362 | A1 * | 12/2005 | Guerrero et al. | 222/148 |
| 2006/0175351 | A1 * | 8/2006 | Reddy et al. | 222/145.5 |
| 2006/0201966 | A1 * | 9/2006 | Macler et al. | 222/83 |
| 2006/0230943 | A1 * | 10/2006 | Stieger et al. | 99/279 |
| 2007/0272317 | A1 * | 11/2007 | Klopfenstein et al. | 137/889 |
| 2008/0061081 | A1 * | 3/2008 | Guerrero et al. | 222/148 |
| 2008/0102178 | A1 * | 5/2008 | Thakur et al. | 426/511 |
| 2008/0179334 | A1 * | 7/2008 | Abramson et al. | 220/568 |

FOREIGN PATENT DOCUMENTS

WO WO-03/065860 A1 8/2003

* cited by examiner

*Primary Examiner*—Thor S Campbell
(74) *Attorney, Agent, or Firm*—Marshall, Gerstein & Borun LLP

(57) ABSTRACT

A device for heating a liquid food with steam, having a liquid-transporting and a steam-transporting pipe (5, 7), where in order to effect the connection of both pipes for the purpose of heating the liquid directly in the pipe in a constructively simple manner, a coupling device (4) for connecting the pipes (5, 7) is provided, which contains at least one perforating needle (11), which is connected to one of the pipes (7, 5) and can pierce a perforable wall section (5a) on the other pipe (5, 7).

16 Claims, 3 Drawing Sheets

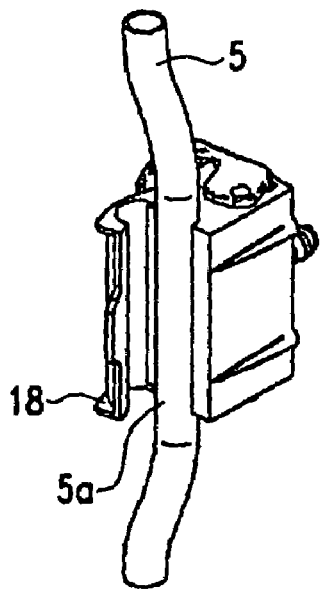
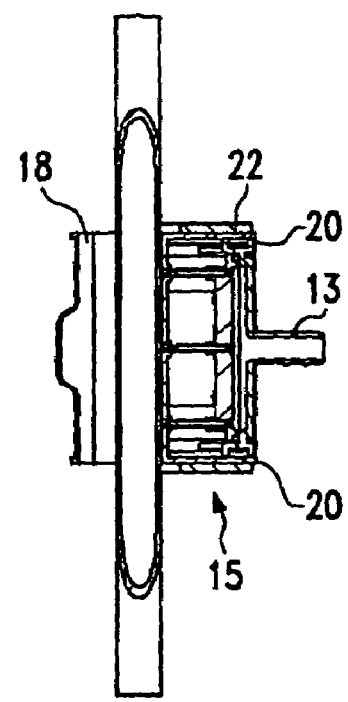
Fig.3A          Fig.3B
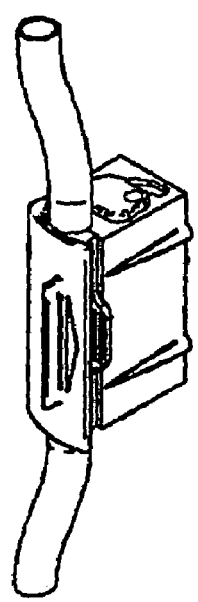
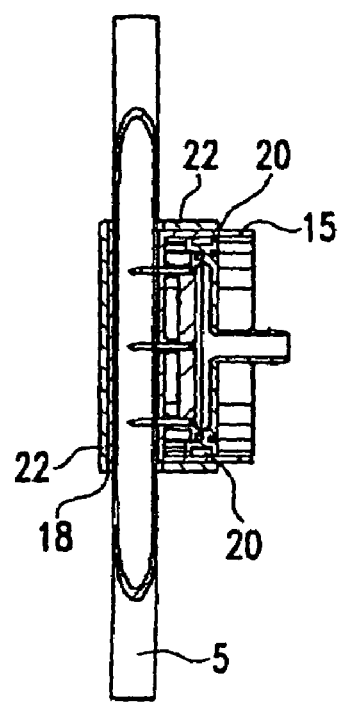
Fig.4A          Fig.4B

DEVICE FOR HEATING A LIQUID WITH STEAM

CROSS-REFERENCE TO RELATED APPLICATION

The present application claims the benefit of priority of European Patent Application No. 05028246.6 filed on Dec. 12, 2005. The entire text of the priority application is incorporated herein by reference in its entirety.

FIELD OF THE DISCLOSURE

The disclosure relates to a device for heating a liquid with steam, such as used in drink-dispensing machines.

BACKGROUND OF THE DISCLOSURE

With drink dispensing devices, in particular automatic drink machines, which discharge liquid food, such as for example hot drinks, soups and milk products, the liquid food is often heated by steam which is introduced into the liquid. Here, the condensing steam dissipates its energy into the liquid to be heated without a significant amount of water being transported into the liquid. Using steam, a relatively large amount of energy can be efficiently introduced into the liquid to be heated in a very short time. Therefore, heating using steam is particularly suitable for liquid foods which are only heated portion by portion on request.

With known drink dispensing devices the heating takes place using steam in a heating chamber in which the liquid and steam are introduced. These heating chambers must however be cleaned at regular intervals, which is cost-intensive, in order to prevent unwanted germ growth and/or contamination of the following prepared drinks.

SUMMARY OF THE DISCLOSURE

The object of the disclosure is therefore to provide an improved device for heating a liquid with steam.

Due to the coupling device according to the disclosure between the steam pipe and the liquid pipe and the use of a perforating needle, the liquid is already heated in the pipe, wherein an intimate mixing of liquid and steam is achieved so that heating of the liquid can take place in a very short time. Furthermore, in this way the area and the number of the elements to be cleaned is reduced so that the cleaning becomes easier. Through the design as coupling device it can be used further even when, for example, the liquid pipe is a disposable hose or part of a disposable package.

Through the accommodation in the housing, the perforating needle is on one hand protected against contamination, and on the other hand cannot injure a user when he joins or parts the two pipes.

Preferably a movement device for piercing the perforating needle into the wall section is provided, because then greater precision is achieved and above all the pipe is prevented from being fully pierced as is the case on inserting the perforating needle with the free hand.

In a practical manner, a locking device is provided which locks the perforating needle in the position for penetrating the wall section. In this way the perforating needle is prevented from being pulled out of its coupling position, for example by the discharge pressure or by an unintentional pulling action.

In order to ensure clean piercing, preferably a locating face is provided for the pipe with the perforable wall section.

Furthermore, it is advantageous if a cleaning device is provided for the perforating needle to remove residues on the perforating needle, which preferably takes place using a wiping device and/or a pulse of steam.

A particularly preferred embodiment of the coupling device includes a housing in which the perforating needle is accommodated in a holder and it also contains the locating face for accepting and supporting the corresponding pipe on inserting the perforating needle. In this way the coupling of the two pipes occurs in an enclosed area protected against contamination.

The coupling of the two pipes preferably occurs via a clamp holder for one of the pipes, because then coupling can be carried out simply without problem.

If one of the pipes is arranged between the first locating face and a further locating face comprising an opening for the passage of the perforating needle, then on one hand the pipe is held very securely and on the other hand the perforating needle is guided when piercing and is cleaned on being withdrawn through wiping on the outer surface.

Piercing by the perforating needle preferably occurs via a cam controlled thrust piece, which is preferably constructed such that it simultaneously locks the perforating needle in the pierced position.

Preferably the perforating needle is connected to the steam pipe, because then particularly good mixing between a large quantity of liquid and a smaller quantity of steam is achieved.

The disclosure is particularly suitable for drink dispensing devices, especially automatic drink machines which must operate with the minimum of service effort and which operate in particular with disposable pipes for the liquid. The coupling device according to the disclosure can be joined without problem and without modifying the steam pipe after the replacement of a reservoir to the discharge hose of the new reservoir.

BRIEF DESCRIPTION OF THE DRAWINGS

An embodiment of the disclosure is explained in more detail in the following based on the drawings. The following are shown.

DETAILED DESCRIPTION OF THE DISCLOSURE

Figure 1:
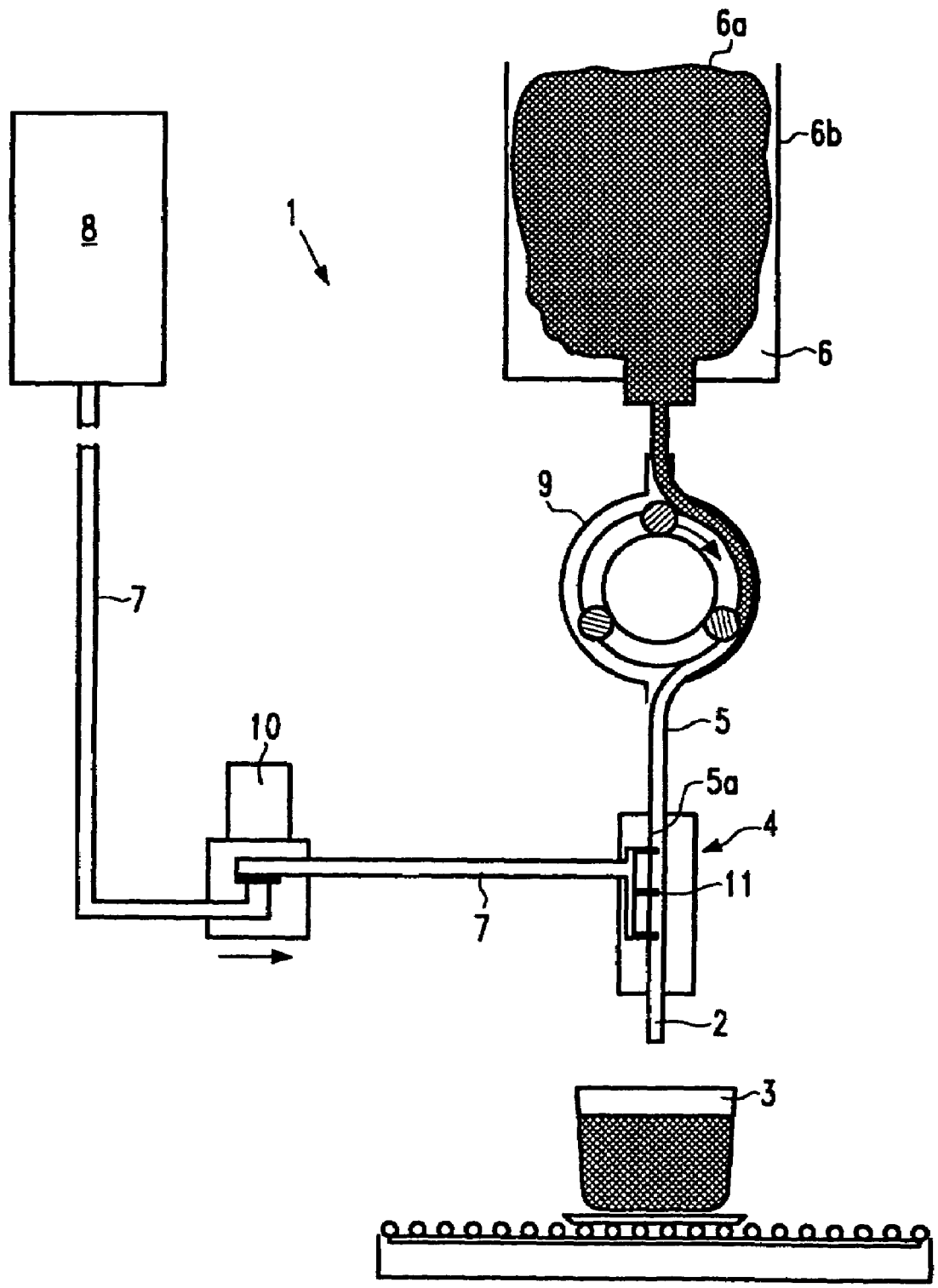
FIG. 1 a perspective view of a drink dispensing device with the device according to the disclosure, FIG. 2 a perspective, exploded view of the coupling device according to the disclosure, FIG. 3A a perspective view of the coupling device according to the disclosure during a first step of the coupling, FIG. 3B a sectioned view of FIG. 3A, FIG. 4A the coupling device according to the disclosure in the fully coupled state, and FIG. 4B a sectioned view of FIG. 4A.

FIG. 1 shows a schematic view of the most important constituent parts of a drink dispensing device 1 equipped according to the disclosure, which for example can be an automatic drink machine, a constituent part of a different drink machine, such as for example a coffee machine or similar equipment. In the following for simplicity the term "drinks" is used, although the drink dispensing device 1 according to the disclosure is also suitable for the discharge of other liquid food, such as for example soup.

The drink dispensing device 1 contains an outlet 2, under which a suitable portion or consumer container 3 can be placed, which is to be filled with the liquid food.

The outlet 2 is located downstream from a coupling device 4, which joins together a first pipe 5, which comes from a store 6 or a preparatory device or similar, and a pipe 7, which comes from a source 8 for a heating medium, preferably steam. The device 1 can comprise many reservoirs 6, which are each connected to their own outlet 2 or via a switch to a common outlet 2, wherein each reservoir 6 containing liquid to be heated is assigned its own coupling device 4 or a coupling device is arranged shortly before the outlet 2, i.e. after the switch.

In the illustrated embodiment the reservoir 6 is a so-called bag-in-box system, i.e. it contains a flexible, collapsing bag 6a in which the liquid is accommodated and a shaped housing 6b. Apart from an exit opening connected with the pipe 5, the bag 6a is closed so that no air can be drawn in when the liquid flows out. Preferably the pipe 5 is manufactured in a single piece with the bag 6a and is formed as a disposable product with it. Preferably the pipe 5 is a flexible hose of plastic, but it contains in each case a wall section 5a which can be pierced or perforated in the region of the coupling device 4. In the pipe 5, if required, a feed or dosing pump 9 (hose pump) or another device for the dosed discharge of the liquid from the store 6 can be provided which is actuated by the user as required via a control device which is not illustrated.

In the pipe 7 coming from the steam generator 8 a dosing and shut-off device 10 is positioned, which is also actuated via the controller when the user requests a hot, liquid food. Preferably the shut-off device contains a solenoid valve. The steam generator 8 can be a conventional steam boiler or a conventional flow heater or similar device.

Figure 2:
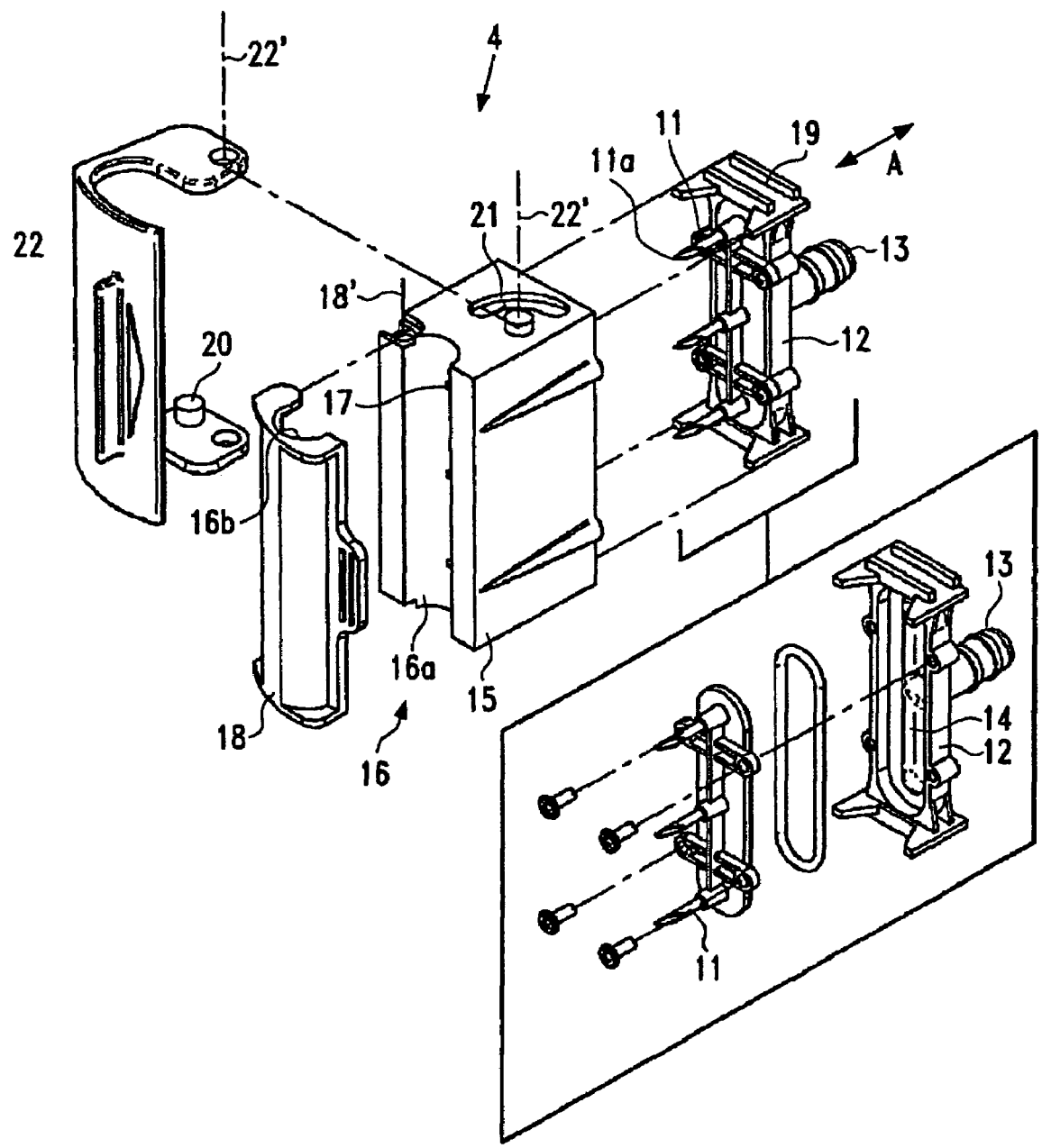

The coupling device 4 is, as can be seen from FIGS. 2 to 4, an injector device for injecting a thin stream of a heating medium, in particular steam, into the flow of the liquid in the pipe 5. For this purpose the coupling device contains at least one needle 11, which is connected to the steam generator 8. The needle 11 is formed as a perforating or hollow needle and includes a tip I a with which the perforable wall section 5a of the pipe 5 can be pierced. In the illustrated embodiment three perforating needles 11 are provided which are arranged in a row, one behind the other, in the direction of liquid flow in the pipe 5. The number of perforating needles 11 is determined according to their flow cross-section, the flow cross-section of the pipe 5 and the flow velocities in the pipes 5 and 7 and should be configured such that the liquid can be heated to the desired temperature during the flow through the coupling device 4.

The perforating needle 11 is held in a holder 12 which includes a connection 13 for the preferably detachable connection of the pipe 7. If several perforating needles 11 are provided, then the holder 12 includes a sealed distribution chamber 14 for the uniform distribution of the heating medium over all perforating needles 11.

The perforating needle 11 is accommodated in a housing 15. The housing 15 is hollow and formed such that the perforating needles 11 are protected against contamination and the user is also protected against injury by the tips 11a. The carrier 12 forms a side wall of the housing 15 and can be moved in the direction of the double arrow A in the interior of the housing 15.

The housing 15 furthermore contains a holder 16 with which the coupling device 4 can be firmly clamped to the pipe 5. The holder 16 includes a first locating face 16a, which forms the side wall of the housing 15 opposite the holder 12 and is preferably matched to the external shape of the pipe 5, i.e. it is rounded off to the same diameter for a pipe with a round cross-section. The locating face 16a is formed as a matrix and contains holes 17 which permit the passage of the perforating needles 11 and guide them. Preferably the diameters of the openings 17 are matched to the external diameters of the perforating needles 11 (i.e. of the same size or only slightly larger) so they act as cleaning devices, which clean the perforating needles by wiping the outer circumference.

The holder 16 also contains a second locating face 16b, which is located opposite the first locating face 16a and which forms an opposing face for accepting the perforating forces. The second locating face 16b is arranged on a flap 18, which is supported for movement on the housing 5, and which in the illustrated embodiment can be swivelled about an axis 18'. Also the second locating face 16b is matched to the external shape of the pipe 5, i.e. rounded off in the illustrated embodiment. Both locating faces 16a, 16b however enclose a connecting space, permitting a clamp seating of the coupling device 4 on the pipe 5, i.e. of the same size or preferably smaller than the external dimension of the pipe 5.

The holder 12 comprises on at least one side, preferably on both sides, facing in or against the direction of flow of the liquid in the pipe 5, a sliding support 19 for a cam 20. The cam or cams 20 are arranged fixed on a thrust piece 22, which is supported on the housing 15 for swivelling about an axis 22'. The housing 15 is provided with a guide 21 for the cams 20 on the sides facing the cams 20. The guide 21 and the sliding support 19 are arranged such that the thrust piece 22 acts as a movement device for moving the holder 12 on the pipe 7 in the direction of the double arrow A. Here, the cams 20 extend through the guide 21 into the sliding support 19 and pull the holder 12 in the direction onto the second locating face 16b when the pipe 7 is to be coupled to the pipe 5.

The thrust piece 22 furthermore acts as a locking device for locking the flap 18 on the housing 15 in a position in which the pipe 5 is enclosed between the two locating faces 16a, 16b. In the illustrated embodiment this locking action occurs through toggle clamping of the thrust piece 22 via the flap 18. In order to achieve this, the movement circles of the flap 18 about the axis 18' and the thrust piece 22 about the axis 22' overlap in a manner as is just permitted for a manual lock due to the material elasticity of pipe 5 and/or flap 18 and/or thrust piece 22. The thrust piece 22 thus acts as a movement device for the perforating needle 11 and as a locking device for locking the flap 18 on closing the holder 16.

When putting the device 1 into operation for the first time, the store 6 is charged with a liquid food. This can for example take place in that a reservoir is filled and the pipe 5, which is preferably a disposable pipe, such as for example a plastic hose, is connected. This can furthermore take place in that the disposable bag with integral pipe 5 described above is employed or a used bag is replaced by a full bag. The pipe 5 is connected to the pump 9 and joined to an outlet 2 integrated into the drink dispensing device 1. To connect the steam pipe 7, it is, if not already a single piece with or permanently joined to the coupling device 4, connected to the connection 13 of the coupling device 4. Then the thrust piece 22 is moved to a position in which the flap 18 can be opened and in which the cams 20 have moved the carrier 12 of the perforating needles 11 into a position in which the perforating needles 11 are withdrawn behind the openings 17. This position is illustrated in FIGS. 3A and 3B. Then the pipe 5 is placed with its perforable wall section 5a against the first locating face 16a and flap 18 is closed. Then the thrust piece 22 is moved about its axis 22' into a perforating and locking position, as can be seen in FIGS. 4A and 4B. During the movement of the thrust piece 22 via the flap 18, the carrier 12 is moved by the cams 20 engaging the sliding support 19 through the guide 21 in the direction of the locating face 16a and of the perforable wall section of the pipe 5 located there, wherein the perforating needles 11 penetrate through the openings 17 with their tips 11a and penetrate the pipe 5 so far that the complete opening cross-section of the perforating needles 11 is located inside the pipe 5. The position of the cams 20 with regard to the axis of rotation 22' and the arrangement of the guide 21 should be matched such that the perforating needles 11 do not pierce the wall of the pipe 5 contacting the second locating face 16b when the thrust piece 22 in the locking position illustrated in FIGS. 4A, 4B has fully moved over the flap 18 and due to this locking holds both the flap with its locating face 16b in firm contact on the pipe 5 and thus fixes the coupling device 4 with the connected pipe 7 to the pipe 5 as well as holding the perforating needles 11 in the interior of the pipe 5. Shortly before or during the penetration of the wall section 5a of the pipe 5a short pulse of steam can be given through the perforating needles 11, which sterilises the wall section 5a at the perforation points and, where applicable, also the external sides of the perforating needles 11.

Once the perforating needles 11 are located inside the pipe 5, the liquid food can be heated to the desired and previously set temperature when flowing through the coupling device 4.

If the connection between the pipes 5 and 7 is to be released, then the thrust piece 22 is swivelled back, wherein on one hand the carrier 12 with the perforating needles 11 is pushed back by the cams 20 into a position in which the perforating needles 11 are withdrawn from the pipe 5 and through the openings 17. On being pulled through the openings 17 any liquid residues are wiped from the perforating needles 11, thus cleaning them. Then the flap 18 is opened and the coupling device 4 is separated from the pipe 5. Then the pipe 5 is discarded, where applicable together with a disposable reservoir, and the device is charged again with liquid. The coupling device 4 is preferably used again and connected to the new pipe 5 in the manner described above.

In a variation of the described and drawn embodiment the pipe 5 can just comprise a perforable material in sections, wherein only this part must be replaced during thorough cleaning and/or on changing the product and/or on recharging the product. The coupling device can comprise a holder of a different design for the pipe, wherein however preferably a locating face is provided for the pipe which is located opposite the complete arrangement section of the perforating needles so that the pipe is supported over all its area on piercing. It is furthermore possible to connect the coupling device to the liquid pipe and to insert the perforating needles into the steam pipe if a particularly strong heating is desired. The movement, locking and perforating functions can also be caused by different elements. Thus, the flap on the housing can be held in the closed position by a latching mechanism, while the perforating needle is pressed in manually and latched there.

We claim:

1. Device for heating a liquid food with steam, comprising a liquid-transporting pipe (5), a steam-transporting pipe (7), and a coupling device (4) for connecting the liquid-transporting pipe (5) and the steam-transporting pipe (7), the coupling device (4) containing at least one perforating needle (11) which is connected to one of the liquid-transporting and steam-transporting pipes (7, 5) and can pierce a perforable wall section (5a) on the other of the liquid-transporting and steam-transporting pipes (5, 7).

2. Device according to claim 1, wherein the perforating needle (11) is accommodated in a housing (15).

3. Device according to claim 1, wherein the coupling device (4) comprises a movement device (22) for piercing the perforating needle (11) into the perforable wall section (5a).

4. Device according to claim 1, wherein the coupling device (4) comprises a locking device (22) for the perforating needle (11) in the position penetrating the perforable wall section (5a).

5. Device according to claim 1, wherein the coupling device (4) contains a locating face (16b) for the one of the liquid-transporting and the steam-transporting pipes (5) that is provided with the perforable wall section (5a).

6. Device according to claim 1, further comprising a cleaning device for the perforating needle (11).

7. Device according to claim 6, and one of a wiping device (17) for mechanically cleaning the perforating needle (11), a device for applying steam to the perforable wall section (5a), where the perforating needle (11) is provided for sterilization.

8. Device according to claim 1, wherein the coupling device (4) contains a housing (15) with a locating face (16b) for accepting and supporting one of the liquid-transporting and steam-transporting pipes (5) and a holder (12) for the perforating needle (11), to which the other of the liquid-transporting and steam transporting pipes (7) is connected, wherein the locating face (16b) and the holder (12) can be moved relative to one another for piercing the perforating needle (11) into the perforable wall section (5a).

9. Device according to claim 1, wherein the coupling device (4) comprises a holder (16) which is provided with a locating face (16b) for the perforable wall section (5a).

10. Device according to claim 8 wherein between the pipe (5) contacting the locating face (16b) and the perforating needle (11) a further locating face (16a), provided with an opening (17), is arranged, wherein the diameter of the opening (17) is one of equally large or only negligibly larger than the outer diameter of the perforating needle (11) so that the opening (17) acts as a wiping device for the perforating needle (11).

11. Device according to claim 1, wherein the coupling device (4) comprises a cam control (19, 20, 21) which moves the perforating needle (11) and the perforable wall section (5a) relative to one another.

12. Device according to claim 1, wherein the coupling device (4) contains a thrust piece (22), which contains a cam control (19, 20, 21), which moves the perforating needle (11) and the perforable wall section (5a) relative to one another, and a locking device, which locks the perforating needle (11) in a position penetrating the wall section (5a).

13. Device according to claim 1, wherein the perforating needle (11) is connected to the steam-transporting pipe (7).

14. Drink dispensing device (1) comprising a device according to claim 1.

15. Drink dispensing device according to claim 14, wherein the perforable wall section (5a) is part of a disposable discharge hose (5).

16. Device according to claim 9, wherein between the pipe contacting the locating face and the perforating needle a further locating face, provided with an opening, is arranged, wherein the diameter of the opening is one of equally large or only negligibly larger than the outer diameter of the perforating needle so that the opening acts as wiping device for the perforating needle.

* * * * *

UNITED STATES PATENT AND TRADEMARK OFFICE
CERTIFICATE OF CORRECTION

PATENT NO. : 7,489,860 B2 Page 1 of 1
APPLICATION NO. : 11/643326
DATED : February 10, 2009
INVENTOR(S) : Armin Startz It is certified that error appears in the above-identified patent and that said Letters Patent is hereby corrected as shown below:

On the Title Page:

Item (30), "05028246" should be -- 05028246.6 --.

Signed and Sealed this

Thirtieth Day of June, 2009

JOHN DOLL
*Acting Director of the United States Patent and Trademark Office*